Feb. 22, 1944.    C. M. PETERS    2,342,301
GAS LIFT VALVE
Filed April 15, 1942
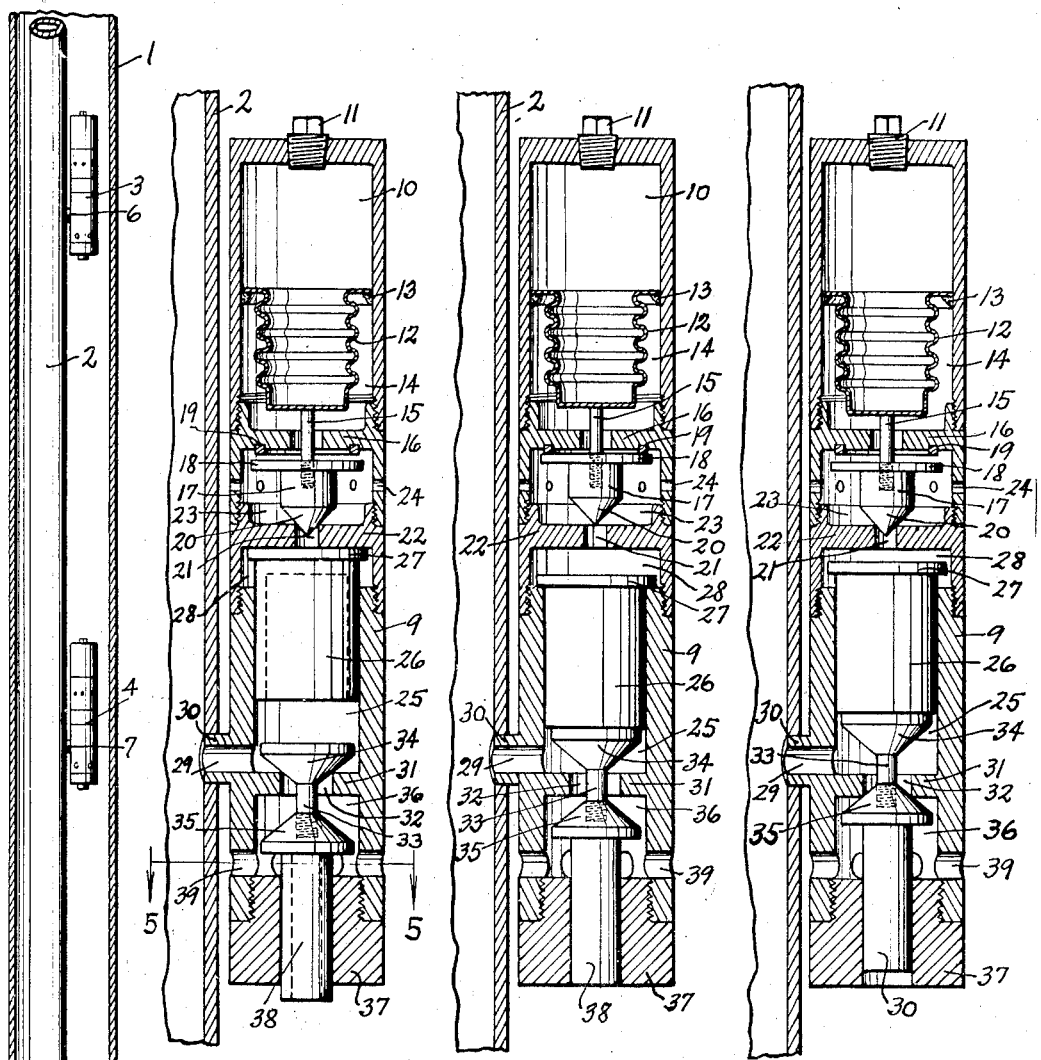
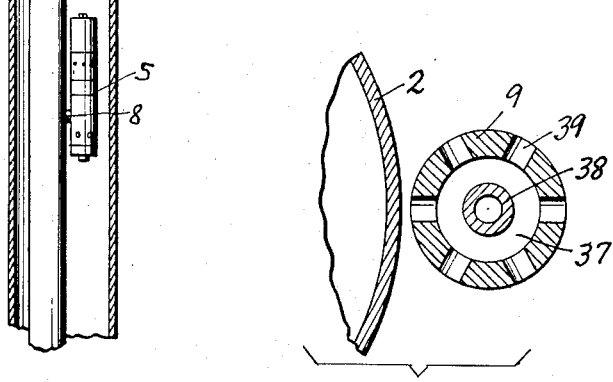
Clifford M. Peters.
INVENTOR.

Patented Feb. 22, 1944

2,342,301

UNITED STATES PATENT OFFICE 2,342,301

GAS LIFT VALVE

Clifford M. Peters, Greggton, Tex., assignor to Oil Lift Supply Company, Greggton, Tex., a corporation of Texas Application April 15, 1942, Serial No. 439,029

6 Claims. (Cl. 137—111)

This invention relates particularily to gas lift valves and has for its general object the provision of such a valve which may be opened and closed by variations in the pressure of the gas or other similar fluid being employed for the purpose of assisting in the lifting of a liquid.

It is well known that a well which does not have sufficient bottom hole pressure to cause it to flow naturally or the bottom hole pressure is so low that it will flow only very slowly, may be made to flow by the injection of gas or air into the column of liquid at some point below the surface thereof. The gas or air so injected may be injected at a relatively slow rate in which event it will form bubbles within the column of liquid thereby lightening the column of liquid until the bottom hole pressure within the well is sufficient to lift the liquid. The well will then flow. If, however, instead of admitting the gas slowly into the column of liquid a large volume of gas is caused to enter the column of liquid within a short time, a single large bubble of gas will be formed in the liquid and this bubble will occupy the entire cross sectional area of the conduit through which the liquid is adapted to flow from the well, thus in effect providing a piston of air or gas within the column of liquid. This piston of air or gas will serve to raise the entire column of liquid from the well in the same manner that a fluid under pressure is able to force the piston of an engine in one direction or the other.

One method heretofore devised for controlling the injection of air or gas into a column of liquid has been to provide a valve controlled by a member movable under the pressure of the air or gas to be injected into the column of liquid. When such a valve is provided, the valve may be opened for example by increasing the pressure upon the body of air or gas which is to be injected into the column of liquid. Then when the operator desires to close the valve, he merely allows the pressure of the body of air or gas to drop and when it has fallen below a predetermined amount the valve which admits the air or gas to the column of liquid will close.

One difficulty, however, that has been encountered with valves of the type just referred to is that because of the limited working space within which these valves must be located in the usual wells, there is insufficient room to provide a bellows that is large enough to cause the opening and closing of a valve of sufficient size to admit the large amounts or volumes of air or gas which it is desirable to inject under certain circumstances. Difficulty has also been encountered due to the fact that under certain circumstances the pressure at a given valve due to the column of liquid standing within the well is so great that it tends to flow back through the valve and into the space provided for the air or gas that is to be injected into the liquid column. This may occur under many different circumstances and for many different reasons such as for example if it should become necessary to release all of the pressure on the air or gas surrounding the valve. If such liquid is allowed to flow out through the valve, the valve is apt to become clogged so that it will not thereafter operate properly.

In view of the foregoing it is an object of this invention to provide a valve of the type set forth which will serve to admit large volumes of gas or air into a column of liquid but which may be controlled with a relatively small punching pressure sensitive member such as a bellows or the like.

Another object of this invention is to provide a valve of the character referred to which will not permit liquid to flow in a reverse direction through the valve.

Other objects and advantages of this invention will become apparent from the following description taken in connection with the accompanying drawing wherein is set forth by way of example one embodiment of the invention.

In the drawing:

Fig. 1 is a view illustrating a well casing in longitudinal cross section and showing therein in side elevation a portion of a tubing for conducting a flow of liquid from a well, with a plurality of valves constructed in accordance with this invention connected to the tubing.

Fig. 2 represents a longitudinal cross section through a valve constructed in accordance with this invention, the parts thereof being shown in the position that they would occupy when the pressure of the liquid within the tubing exceeds that of the gas or air within the casing surrounding the tubing.

Fig. 3 is a view similar to Fig. 2 but illustrating the parts in the position which they would occupy when the pressure of the gas or air in the space surrounding the tubing exceeds a predetermined value and is greater than the pressure existing within the tubing, so that gas or air may be forced through the valve into the tubing.

Fig. 4 is a view similar to Figs. 2 and 3 but illustrating the parts in the position which they would occupy when the pressure of the gas within the space between the tubing and the casing is less than sufficient to cause the valve to open, but is sufficient to prevent any back flow of liquid from the tubing into the casing.

Fig. 5 is a transverse cross section taken along the line 5—5 of Fig. 2.

Referring now more in detail to the drawing, the numeral 1 illustrates a portion of a well casing which may be of any conventional type. Within this casing is disclosed the tubing 2 through which the oil or other liquid is adapted to flow from the well to the surface of the ground. Located along this tubing 2 and connected thereto at suitable intervals there are shown a plurality of valves 3, 4 and 5 respectively of the type to which this invention relates. Each of these valves is connected to the tubing, these connections being indicated by the numerals 6, 7 and 8 respectively.

Referring now more particularly to Figs. 2, 3 and 4, each of the valves is provided with a housing generally indicated by the numeral 9. At the upper end of each housing is a chamber 10 having an opening to the exterior through the upper end of the housing, this opening being normally closed by means of a plug 11 or other suitable means.

The lower end of the chamber 10 is closed by a bellows 12 which is welded or otherwise secured about its periphery to the inner wall of the housing 9 as shown at 13. Below this bellows 12 is a chamber 14, and the bellows 12 is connected by means of a stem 15 extending through an opening in the partition 16 to the valve member 17.

The valve element 17 is provided with a disk portion 18 adjacent its upper end, this disk portion being adapted to seat against and form a seal with the sealing ring 19 when the valve 17 is moved upwardly to the extent of its movement. On its lower end, the valve element 17 is provided with a tapered or conical valve portion 20 adapted to seat against the upper edge of the opening 21 through the partition 22. It will thus be seen that between the partitions 16 and 22 there is formed still another chamber 23 within the valve housing 9. This chamber 23 is constantly in communication with the space outside of the valve housing 9 and outside of the tubing 2 through the medium of the openings 24. There may be only one of these openings 24 or more than one spaced circumferentially about the housing 9.

Below the partition 22 is still another chamber 25 in which is slidingly mounted a plunger or piston 26. This piston has a laterally extending flange or head 27 at its upper end, this head being adapted to move upwardly and downwardly within the portion 28 of the chamber 25, this portion 28 having a diameter greater than the major portion of the chamber 25. The upward movement of the plunger 26 is of course limited by the contact between the upper end of the plunger and the partition 22, while the downward movement of this plunger is limited by contact between the flange 27 and the shoulder at the lower end of the enlarged portion 28.

The valve housing 9 is in communication with the interior of the tubing 2, this communication being provided between the chamber 25 and the interior of the tubing by means of the passageway 29 through the boss 30. The boss 30 is adapted to be secured by any suitable manner to an opening through the tubing wall.

Just below the opening 29 and forming the lower end of the chamber 25 is a partition 31 having an opening 32 therethrough. Extending through this opening 32 is a stem 33 having a valve 34 on its upper end and another valve 35 on its lower end, either of which valves is adapted to close the opening 32 depending upon the position of the two valves. In their intermediate position as shown in Fig. 3 the opening 32 is unobstructed so that flow may take place therethrough.

The chamber 36 below the partition 31 is closed at its lower end by means of a closure 37 having an opening therethrough adapted to receive the plunger portion 38 that is integral with the valve elements 34 and 35. This chamber 36 however, is constantly in communication with the space outside of the tubing and outside of the valve housing by means of the openings 39 spaced circumferentially about the valve housing just above the closure 37.

In operation, if for any reason the pressure of air or gas within the space between the tubing and the casing should be less than the pressure within the tubing at the valve due to the column of liquid within the tubing, the liquid will naturally tend to flow out through the valve. As soon as any such flow begins however, the same will pass through the opening 32 and impinge upon the valve element 35 forcing it downwardly. When this valve element is forced downwardly it causes the valve element 34 to contact the upper edge of the opening 32 and close the same. Thereafter, no further flow can take place through the valve from the tubing into the space between the tubing and the casing.

If it be desired to cause the valve to open so that a charge of air or gas may be caused to enter the tubing, the pressure of the air or gas within the casing is increased. When this pressure has been increased sufficiently, it will enter through the ports 24 into the chamber 23 and pass from this chamber through the opening in the partition 16 into the chamber 14. When the pressure is sufficient to overcome the pressure within the chamber 10, the bellows 12 will be collapsed. It may be stated at this point that the pressure within the chamber 10 may be made any desired and predetermined value and will determine the pressure at which the bellows 12 will be collapsed.

The first effect of the collapsing of the bellows 12 will be to draw the valve element 17 upwardly until the disk-like portion 18 thereof seats against the sealing ring 19. Thereafter, no further gas or air under pressure may enter the chamber 14 so that regardless of how high this pressure of the gas or air may become it cannot become so great within the chamber 14 that the bellows 12 will be ruptured or otherwise injured.

When the valve element 17 moves upwardly, the conical portion 20 likewise moves upwardly and opens the port 21 into the chamber 28. Air or gas under pressure will thereupon enter the chamber 28 and force the piston 26 downwardly to the position illustrated in Fig. 3. This piston moving downwardly until it is stopped by the flange 27 coming in contact with the shoulder within the housing 9 will be stopped at such point that the valve element 34 may move upwardly until it is open but may not move upwardly far enough to permit the valve 35 to close. The valve elements 34 and 35 will on the other hand be urged upwardly as far as possible by the action of the pressure of the air or gas upon the lower end of the plunger 38 and upon the valve elements 34 and 35. The parts will therefore assume the position illustrated in Fig. 3 of the drawing, in which position a large volume of air or gas under pressure may enter through the ports 39 pass upwardly through the port 32, and thence into the tubing through the passageway 29.

When it is desired to cause the closing of the valve so as to permit no more gas or air under pressure to enter the tubing, the pressure of the air or gas in the space between the tubing and the casing will be lowered a sufficient amount so that the bellows 12 will again expand. When this bellows expands the valve element 17 will move downwardly until the conical portion 20 thereof seats against the upper edge of the passageway 21 and closes the same. The piston 26, while fitting snugly within the chamber 25, will permit a slight leakage of air or gas past the piston, and as this leakage occurs, the pressure of the air or gas acting upon the plunger 38 and the valve elements 34 and 35 will move these valve elements and the piston 26 upwardly until the valve element 35 seats against the opening 32 closing the same and preventing the passage of any more air or gas under pressure into the tubing.

From the foregoing it will be seen that in the structure just described, provision may be made for introducing as great a volume as may be necessary into the tubing from the space between the tubing and the casing, but since the bellows 12 is called upon to control only the opening and closing of the relatively small valve element 17, and since this opening and closing is not against a great differential of pressure, the bellows 12 may be made as small as may be necessary to fit it into the space available. At the same time, a valve structure has been provided in which the action is such that at no time can liquid or other fluid flow to any substantial degree from the space within the tubing into the space between the tubing and the casing.

It will be understood that while the valve has been illustrated and described in such position as to control the flow of air or gas under pressure from the space within the casing into the space within the tubing, this same valve arrangement may be reversed so as to control the flow of liquid from a well through the space between the casing and the tubing instead of upwardly through the tubing. In such event of course the air or gas under pressure will be injected into the well through the tubing instead of through the casing and the valve assembly will be placed within the tubing.

A structure has thus been provided which is capable of carrying out and accomplishing all of the objects and advantages sought by this invention.

Having described my invention, I claim:

1. In a mechanism for controlling the admission of air or gas under pressure into a liquid column, a main valve adapted to be closed by a relatively small excess of pressure in said gas or air over the pressure within the liquid column, pressure responsive means operable when subjected to the pressure of said gas or air to open said main valve, means preventing said pressure responsive means from moving said main valve past its normal open position, a pilot valve for controlling the application of the pressure of said gas or air to said pressure responsive means, and a second pressure responsive means subject at all times while said pilot valve is closed to the pressure of the said gas or air and operable when said pressure exceeds a predetermined amount to open said pilot valve, said main valve having a part forming an auxiliary check valve adapted to seat and prevent flow from the liquid column into the space normally occupied by the gas or air under pressure when said main valve is forced from its closed past its normal open position by a predetermined amount.

2. In a valve for controlling the admission of gas or air under pressure to a column of liquid, a main valve element having parts forming closures when the element occupies each of two extreme positions respectively and being incapable of forming a closure when the valve occupies an intermediate piston, said element being adapted to close in one direction when the pressure within the liquid column exceeds the pressure of the air or gas to be injected therein and to close in a different direction when the pressure of the air or gas exceeds the pressure in the liquid column, means subject to the pressure of the air or gas for moving said valve element from said last mentioned closed position to such intermediate open position when the pressure of said gas or air to be injected exceeds a predetermined value, and means for preventing said last mentioned means from moving said valve element past its intermediate normally open position.

3. In a means for controlling the admission of air or gas under pressure to a liquid column, a main valve having a part movable in one direction to close when the pressure within said liquid column exceeds the pressure of the air or gas to be injected and a part movable in a different direction to close when the pressure of the air or gas to be injected exceeds the pressure in the liquid column, a pressure responsive means for moving said valve including said parts to a neutral open position from said last mentioned closed position when said pressure responsive means is subjected to the pressure of said air or gas to be injected, means to prevent said pressure responsive means from moving said main valve past its normal open position, and a pressure controlled pilot valve adapted to be opened to subject said pressure responsive means to the pressure of the air or gas to be injected when the pressure of the air or gas to be injected exceeds a predetermined value.

4. In a means for controlling the injection of air or gas under pressure into a liquid column, a main valve having a part movable in one direction to close when the pressure in the liquid column exceeds the pressure of the air or gas to be injected, and a part movable in the opposite direction to close when the pressure of the air or gas to be injected exceeds the pressure in the liquid column, pressure responsive means adapted when subjected to the pressure of said air or gas to move said valve including said parts to an intermediate open position from said last mentioned closed position, means to prevent said pressure responsive means from moving said main valve past its normal open position, a pilot valve for controlling the admission of air or gas under pressure to said pressure responsive means, and a second pressure responsive means subject at all times while said pilot valve is closed to the pressure of air or gas to be injected and movable when the pressure of said air or gas exceeds a predetermined value to open said pilot valve and admit the air or gas under pressure to said first pressure responsive means.

5. In a means for controlling the admission of air or gas under pressure to a liquid column, a main valve having a portion subject at all times to the differential of pressure between said liquid column and the air or gas to be injected, whereby said valve will be urged toward closed position at all times when the pressure of air or gas to be injected exceeds the pressure in the column of liquid, and toward open position when the pressure in the column of liquid exceeds that of the air or gas to be injected, pressure responsive means movable when subjected to the pressure of the air or gas to be injected to engage said main valve and move it to open position, means for preventing said pressure responsive means from moving said main valve past its open position, a pilot valve for controlling the application of air or gas under pressure to said pressure responsive means, a second pressure responsive means for opening said pilot valve when the pressure of the air or gas to be injected exceeds a predetermined value, and an auxiliary valve element carried by said main valve and adapted to close off communication with the liquid column when said main valve is moved toward and beyond its open position a predetermined amount.

6. In a means for controlling the admission of air or gas under pressure to a liquid column, a main valve having a portion subject at all times to the differential of pressure between said liquid column and the air or gas to be injected, whereby said valve will be urged toward closed position at all times when the pressure of air or gas to be injected exceeds the pressure in the column of liquid, pressure responsive means movable when subjected to the pressure of the air or gas to be injected to engage said main valve and move it to open position, a pilot valve for controlling the application of air or gas under pressure to said pressure responsive means, and a second pressure responsive means for opening said pilot valve when the pressure of the air or gas to be injected exceeds a predetermined value, said pilot valve having a part adapted when said pilot valve reaches its fully open position to shut off any additional application of air or gas under pressure to said second pressure responsive means.

CLIFFORD M. PETERS.